United States Patent Office 3,513,214
Patented May 19, 1970

3,513,214
METHOD OF PRODUCING ACETYLENE AND CHLORINATED HYDROCARBONS
Henry O. Mottern, Far Hills, and Victor A. Sims, Bayonne, N.J., assignors to Air Reduction Company, Incorporated, New York, N.Y., a corporation of New York
No Drawing. Filed Apr. 4, 1967, Ser. No. 628,309
Int. Cl. C07c 11/24, 17/08
U.S. Cl. 260—679        9 Claims

ABSTRACT OF THE DISCLOSURE

Acetylene is produced by heating a vapor mixture of methane, chlorine and oxygen to initiate the exothermic reaction, and maintaining the reaction mixture at not less than the initiation temperature for 0.005 to 0.05 second.

---

This invention relates to the production of acetylene and chlorinated hydrocarbons. More particularly it relates to the vapor phase formation of acetylene, chlorinated hydrocarbons and hydrogen chloride from the high temperature oxyhalogenation of lower hydrocarbons. Specifically, it relates to the preparation of acetylene from a heat treated reaction mixture of methane, chlorine and oxygen.

Acetylene has for many years been commercially produced by the well-known calcium carbide process. More recently, technological advances in, for example, the petrochemical field have led to competitive processes for producing this basic material. Similarly, electric arc processes and reduced pressure pyrolysis of hydrocarbons have been reported as being suitable. While these processes have been generally successful they suffer certain disadvantages such as high cost of raw material and power, inflexible control of process conditions, and the like, which tend to limit their full commercial potential. Current research efforts in the field have therefore been directed to exploring new routes for the economical formation of acetylene.

It is accordingly an object of the present invention to provide a process for the production of acetylene which utilizes low cost starting materials. It is another object of the invention to provide such a process in which by-produced hydrogen chloride and chlorinated hydrocarbons are obtained in commercially useable amounts. Yet another object of the invention is to provide a highly exothermic process for producing acetylene thereby minimizing the amount of energy needed from an external source. These and other objects will appear from the following detailed disclosure.

In general, the method of the present invention, by which the above objects are achieved, involves forming a vapor feed mixture of methane, chlorine and oxygen, heating this mixture to an elevated temperature sufficient to induce an exothermic reaction, and maintaining the heated reaction mixture at the elevated temperature for a specified period of time. The process may be regarded as one which produces a spectrum of useful products, notable among which are acetylene and monochloromethane. The relative amounts of each product vary to some extent with relative concentrations of constituents in the vapor feed mixture. For example, vapor feed mixtures containing an excess of chlorine relative to methane produce favorable amounts of both acetylene and monochlormethane, while mixtures containing excess methane relative to chlorine tend to promote production of larger amounts of the chloromethane with suppression of acetylene formation. In general, therefore, while a mole ratio of at least 0.5 mole chlorine per mole methane in vapor feed mixture may be employed, it is preferred to use at least equimolar amounts and most preferred are from 1–2 moles chlorine per mole methane in feed.

Oxygen is required in the process and is suitably employed at molar ratios of at least 0.1 mole oxygen per mole methane in feed. Large amounts should be avoided from a safety factor point of view since explosive mixtures may tend to develop. A suitable range is from 0.1 to 0.5 mole oxygen per mole of methane in feed.

The vapor mixture, once formed, is ready for heating to the elevated temperature as aforesaid to induce the exothermic reaction. In the preferred mode of practising the invention, however, it is desirable to preheat the mixture for a short period of time at a tempearture below that at which any appreciable reaction takes place, and then to submit the heated mixture to higher temperatures to induce the reaction. A convenient temperature range for this is from about 300° to 600° C. and preferably from 390–420° C., while the period of time that the mixture is held in this range (i.e. residence time) is generally from 0.01 to 0.50 second and preferably from 0.08 to 0.18 second. These conditions may be achieved, as is done in the preferred manner of carrying out the process, by utilizing continuous gas flow techniques. That is, the vapor feed mixture is continuously directed into a chamber of the type well known in the art for vapor phase techniques, which chamber is preheated to a temperature sufficient to heat the flowing vapor feed to the desired level. The dimensions of the chamber, the gas flow rates and other like parameters necessary to give gas residence times within the range recited above may be easily calculated by one skilled in the art.

The preheated gas mixture is next heated to a temperature sufficient to initiate an exothermic reaction between the methane, chlorine and oxygen. Temperatures of the order of 600° C. and preferably 700° to 850° are generally sufficient for this purpose. In the preferred embodiment under discussion, this is achieved by directing the preheated mixture directly into a chamber heated to the desired level. Once initiated, the reaction is allowed to proceed without providing additional external energy except that which is necessary to keep the mixture in a reacting state. In view of the exothermic nature of the reaction, the temperature of the gases themselves will rise to 1000° C. or greater once the reaction is initiated. Thus at steady state, it will only be necessary to supply external energy sufficient to induce the exotherms. Therefore, the temperature of the gases should not be allowed to go below 600° C. and preferably not below 700° C. It has been discovered that the production of large amounts of acetylene at this point in the process is integrally related to the length of time that the reaction mixture is allowed to stay at the elevated temperatures. In this regard, it has been discovered that maximum production of acetylene is achieved when a residence time within the reaction chamber of from 0.005 to 0.050 second is employed. Large amounts of monochloromethane are also obtained under these conditions. Values outside this range, especially at the lower end, may be employed where larger amounts of the chloromethane relative to acetylene are desired. The preferred range for residence time in this stage is from 0.01 to 0.02 second. Here again, those skilled in the art will be able to calculate suitable gas flow velocities and chamber dimensions to provide these residence times.

As a result of carrying out the above-described preferred process, there is obtained a vapor product mixture containing often as much as 35 mole percent acetylene, as determined by gas phase chromatography, and usually from about 10 to 30 mole percent, as well as amounts of monochloromethane usually ranging from 5–21 mole percent. Attending these high yields are good conversion figures usually ranging from about 30–50% for acetylene and from 1–25% for chloromethane based on methane consumed. There is also obtained a minor amount of vinyl chloride, of the order of from 0.5 to 2.0 mole percent, minor amounts of ethylene and ethane and large amounts of carbon monoxide. Hydrogen chloride is also formed in large amounts and is available for subsequent commercial use.

These products may be separated and recovered by techniques well known in the art. For example, the hot effluent gases are rapidly quenched, as by external cooling for example, and the hydrogen chloride scrubbed out in a water treatment. Unreacted chlorine and carbon dioxide may be absorbed in a caustic soda wash. The acetylene, chloromethane, unreacted methane, oxygen, carbon monoxide and vinyl chloride may be separated by standard techniques as, for example, by low temperature fractional distillation.

If desired, the original vapor mixture may also contain quantities of a suitable diluent, such as nitrogen or hydrogen chloride, as an aid in controlling the temperature rise in the exothermic reaction. It has been found, however, that too large a quantity of diluent suppresses the formation of acetylene and is therefore undesirable. Suitable results are obtained when the diluent is present in less than equimolar amounts based on the amount of methane in the feed, and preferably from 0 to 0.5 mole/mole methane.

Although it is not preferred to do so, the vapor feed mixture may be directed over a catalyst bed for induction of the exothermic reaction. When this system is employed, a somewhat broader range of residence times, of the order of from about 0.06 to 0.9 second is employed. Similarly, larger amounts of methane relative to chlorine of the order of 3–4 moles per mole of chlorine and oxygen are normally used. Such a modification favors the formation of methyl chloride and suppresses the formation of acetylene in a highly exothermic reaction. Ordinarily, product gases will be obtained in which methyl chloride will constitute about 11 mole percent whereas the amount of acetylene will be reduced to about 1 mole percent. Based on the amount of chlorine consumed, however, the methyl chloride production is attended by very good conversion figures, as much as 50 percent of fed chlorine being converted to the chloromethane.

The catalysts employed in this aspect of the invention are normally those classified as chlorination catalysts and are illustrated by the chlorides of copper, cerium, lanthanum, neodymium and especially mixtures of these; ion exchange resins such as sodium aluminosilicate, copper aluminosilicate and the like.

With regard to the temperature of reaction, the presence of catalyst tends to reduce the level at which initiation of the reaction occurs below that wherein no catalyst is employed. Thus, while temperatures of the order of 400–425° C. will begin to initiate the reaction, it is preferred to employ higher temperatures, for example in the range of from 500 to 1100° C. in combination with the residence times as above mentioned. A preheating stage can be normally employed when the catalyst modification is used.

The following examples are given for purposes of illustration only and not by way of limitation.

EXAMPLES 1–7

The following procedure is ilustrative of the general method for producing acetylene according to the present invention.

Gas mixtures of methane, chlorine, oxygen and nitrogen in the mole ratios indicated in Table I below are mixed and introduced into a Pyrex glass coil (5 mm. bore x 50 in. long) which is immersed in a molten lead bath heated to the temperature indicated in the table. The gas is flowed through the coil at the rate indicated to give the indicated residence time. The preheated gases are then fed to the inner tube of a horizontal, double walled mullite chamber (outer tube of 22 mm. ID and inner tube or reaction chamber of 14 mm. ID x 2¼ in. long). The chamber is suitably heated externally by any convenient means, e.g. by gas burners, to give a red hot zone about 2 cm. long. Internal temperature of the combustion chamber, under static conditions and when red hot outside, is about 725° C. The combustion chamber is equipped with a coaxial water condenser, the internal cold finger of which extends into the mullite tube. This together with the external concentric condenser, provides a narrow passageway for rapid cooling of hot effluent gases. The reaction gases proceed through the chamber at the velocity indicated below to give the indicated residence time in the hot zone. After establishing equilibrium, the effluent is characterized by passing the quenched gas stream through a collection train comprising a round bottom receiver, condenser, water scrubber, 10–20% sodium hydroxide scrubber, Drierite tower, gas sampling tube, and wet test meter. The first receiver collects residual coke and tar plus any liquid product. Analysis of the water scrubber gives approximate amount of HCl generated by the reaction; the caustic scrubber establishes the amount of $Cl_2$ and $CO_2$ by chemical analysis for hypochlorite, carbonate, and hydroxide. The wet test meter gives the volume of remaining off gas. Gas chromatography analysis of the collected gas samples gives product distribution of the insoluble gases.

Table I below summarizes the results obtained when the foregoing procedure is followed using the parameters recited in the table.

Examples 1–4 show that high conversions of acetylene are obtained using a feed of $CH_4$, $Cl_2$, and oxygen under the conditions shown in Table I. Example 5 shows that the amount of acetylene is drastically reduced and amount of methyl chloride appreciably increased when a shorter contact time is used. Examples 6 and 7 show that the introduction of nitrogen as a diluent also causes a reduction in acetylene production.

TABLE I

| | Reaction conditions | | | | | | | Results | | | | | | | | | |
|---|---|---|---|---|---|---|---|---|---|---|---|---|---|---|---|---|---|
| | Feed (mole-ratio) | | | | Preheater coil | | Reaction zone (700–1,200° C.) | | Product gases (mole percent)[1] | | | | | | | | Percent conversion of methane to— |
| | $CH_4$ | $Cl_2$ | $O_2$ | $N_2$ | Temp. (° C.) | Residence (sec.) | Velocity (m./sec.) | Residence (sec.) | $CH_4$ | $C_2H_2$ | $C_2H_4$ + $C_2H_6$ | $CH_2$ ‖ $CHCl$ | $CH_3Cl$ | CO | $O_2$ | $N_2$ | $C_2H_2$ | $CH_3Cl$ |
| Example: | | | | | | | | | | | | | | | | | | |
| 1 | 1 | 1 | 0.33 | 0 | 415 | 0.14 | 1.26 | 0.016 | 29 | 18 | 2 | 1 | 5 | 34 | 11 | 0 | 34 | 7 |
| 2 | 1 | 1.33 | 0.33 | 0 | 415 | 0.12 | 1.44 | 0.014 | 16 | 22 | 1 | 1 | 1 | 53 | 6 | 0 | 44 | 1 |
| 3 | 1 | 1.50 | 0.17 | 0 | 410 | 0.12 | 1.44 | 0.014 | 23 | 32 | 1 | 1 | 3 | 32 | 8 | 0 | 52 | 3 |
| 4 | 1 | 1.50 | 0.17 | 0 | 415 | 0.12 | 1.44 | 0.014 | 20 | 33 | 1 | 1 | 1 | 37 | 7 | 0 | 53 | 1 |
| 5 | 1 | 1.30 | 0.16 | 0 | 395 | 0.09 | 2.22 | 0.009 | 54 | 3 | 3 | 2 | 22 | 9 | 7 | 0 | 8 | 25 |
| 6 | 1 | 1.33 | 0.33 | 0.67 | 390 | 0.10 | 1.81 | 0.011 | 22 | 7 | 1 | 1 | 10 | 17 | 7 | 35 | 20 | 16 |
| 7 | 1 | 1.50 | 0.37 | 0.88 | 395 | 0.16 | 1.08 | 0.018 | 13 | 10 | | | 1 | 4 | 25 | 7 | 40 | 16 | 8 |

[1] Based on gas chromatography analysis of scrubbed gases (free of $Cl_2$, HCl, $CO_2$, and water).

EXAMPLES 8–12

The general procedure of Examples 1–7 is employed utilizing the reaction conditions shown in Table II following. Table III shows the results obtained.

TABLE II

| | Reaction conditions | | | | | | |
|---|---|---|---|---|---|---|---|
| | Feed (molar ratio) | | | | Preheater coil | | In chamber |
| Ex. | CH₄ | Cl₂ | O₂ | N₂ | Preheat bath, temp. | Residence (sec) | Velocity (m./sec.) | Residence (sec.) |
| 8 | 1 | 0 | 0 | 0 | 485 | 0.96 | 0.18 | 0.111 |
| 9 | 1 | 0 | 1.5 | 1.3 | 415 | 0.16 | 1.08 | 0.018 |
| 10 | 1 | 1.5 | 0 | 1.3 | 415 | 0.16 | 1.08 | 0.018 |
| 11 | 1.5 | 1 | 1 | 0.5 | 415 | 0.12 | 1.44 | 0.014 |
| 12 | 1 | 1.5 | 0.4 | | 410 | 0.16 | 1.08 | 0.018 |
| | (CH₄ | Cl₂ | O₂ | HCl) | | | | |

TABLE III

| | Product gases (mole percent)[1] | | | | | Percent conversion of methane to— | |
|---|---|---|---|---|---|---|---|
| Ex. | CH₄ | O₄ | N₂ | CH≡CH | CH₃Cl | CH≡CH | CH₃Cl |
| 8 | 99 | 0 | 0 | 0.8 | 0 | 1 | 0 |
| 9 | 25 | 40 | 35 | <0.1 | 0 | <1 | 0 |
| 10 | 29 | 0 | 57 | 0 | 14 | 0 | 37 |
| 11 | 37 | 30 | 16 | <0.3 | 10 | <1 | 20 |
| 12 | 29 | 17 | 0 | 10 | 11 | 20 | 15 |

[1] See footnote 1, Table I.

Example 8 above shows that the pyrolysis of methane alone under the reaction conditions shown produces a negligible amount of acetylene. Example 9 shows that the reaction of methane and oxygen in the absence of chlorine also produces a minor amount of acetylene. Example 10, on the other hand, shows that the reaction of methane and chlorine in the absence of oxygen produces a large amount of methyl chloride but no acetylene. Example 11 shows that an excess of methane to chlorine and oxygen gives very little acetylene and some monochloromethane. Example 12 illustrates the use of HCl in the feed to give modest conversions to acetylene and methyl chloride.

EXAMPLE 13

The general procedure of Examples 1–12 is followed except that CH₃Cl is used in place of methane. A vapor mixture of 1 CH₃Cl:1 Cl₂:0.1 N₂ 0.7 N₂ is reacted at 1000° C. for 0.02 sec. in the above-described combustion chamber. Twelve percent of the CH₃Cl feed is converted to vinyl chloride.

EXAMPLE 14

The oxychlorination of methane is conducted in a catalyst bed. The gases are preheated at 600–700° C. for a short time and then are directed through a sodium aluminosilicate (zeolite) catalyst bed of a 2-in. depth. For a vapor mixture of 4 CH₄:1 Cl₂:1.3 O₂ molar ratio and contact time of 0.5 sec. and 750–1000° C. bed temperature, 50% of the chlorine feed is converted to monochloromethane. A small amount of acetylene and vinyl chloride are also formed.

As previously mentioned, the hydrogen chloride which is formed in the above-described process is available for subsequent commercial use. In particular, it can be combined with the acetylene which is also, of course, produced in this process, to form vinyl chloride, using the conventional techniques for combining these two reactants in the well-known vinyl chloride synthesis.

We claim:

1. The method of producing acetylene which comprises forming a vapor mixture feed comprising methane, chlorine and oxygen, heating said mixture in a preheating zone to an elevated temperature of at least about 300° C. great enough to initiate an exothermic reaction to form thereby a vapor reaction mixture, passing said mixture into a reaction zone and maintaining said reaction mixture in said reaction zone at a temperature of at least about 600° C. at a residence time of from .005 to .05 second, the temperature in said preheating zone being lower than the temperature in said reaction zone and said preheating zone being distinct from said reaction zone.

2. The method according to claim 1 wherein the vapor feed mixture, prior to said elevated temperature heating, is preheated at a temperature less than that sufficient to initiate said exothermic reaction.

3. The method according to claim 2 wherein the method is carried out under continuous vapor flow conditions.

4. The method according to claim 3 wherein the vapor feed mixture comprises at least 0.5 mole of chlorine and at least 0.1 mole of oxygen each per mole of methane in feed.

5. The method according to claim 4 wherein the elevated, reaction initiating temperature is at least 600° C. and the residence time of the vapor reaction mixture at the elevated temperature is from 0.01 to 0.02 second.

6. The method according to claim 5 wherein the mole ratio of chlorine to methane and oxygen to methane, each in the vapor feed mixture feed, is from 1–2:1 and 0.1–0.5:1, respectively, and the elevated, reaction initiating temperature is at least 700° C.

7. The method according to claim 6 for forming a vapor reaction mixture comprising acetylene and monochloromethane wherein the preheating temperature is in the range of from 385–425° C. and the residence time in the preheating stage is from 0.01 to 0.5 second.

8. The method of claim 3 wherein the vapor mixture feed additionally contains nitrogen in less than equimolar amounts based on methane in the feed.

9. The method of claim 7 wherein the vapor feed mixture additionally contains from 0.3 to 0.9 mole of nitrogen per mole of methane in the feed.

References Cited

UNITED STATES PATENTS 1,591,984  7/1962  Krause et al. _____ 260—662
3,267,160  8/1966  McGreevy et al. _____ 260—654
3,336,412  8/1967  Lyon et al. _____ 260—679

DELBERT E. GANTZ, Primary Examiner

J. D. MYERS, Assistant Examiner

U.S. Cl. X.R.

260—663

UNITED STATES PATENT OFFICE
CERTIFICATE OF CORRECTION

Patent No. 3,513,214　　　　　　　　　　Dated May 19, 1970

Inventor(s) Henry O. Mottern and Victor A. Sims

It is certified that error appears in the above-identified patent and that said Letters Patent are hereby corrected as shown below:

Col. 4, line 7, "ilustrative" should read -- illustrative --.

Col. 5, Table III, third column, "O4" should read -- $O_2$ --, line 35, "convensions" should read -- conversions --.

SIGNED AND
SEALED
OCT 6 - 1970

OCT. 6, 1970

(SEAL)
Attest:

Edward M. Fletcher, Jr.
Attesting Officer

WILLIAM E. SCHUYLER, JR.
Commissioner of Patents